3,087,779
FUEL ELEMENT RECOVERY PROCESS
James R. Johnson, White Bear Lake, and William E. Rowe, St. Paul, Minn., assignors to Minnesota Mining and Manufacturing Company, St. Paul, Minn., a corporation of Delaware
No Drawing. Filed June 25, 1958, Ser. No. 744,323
5 Claims. (Cl. 23—14.5)

This invention relates to radioactive materials, and more particularly to a process for recovering radioactive and fissionable products from carbon containing such substances.

It has been proposed to use the energy derived from nuclear fission as a source of power, to produce electricity and the like; and power plants have been designed and built which utilize various designs of construction to produce heat from fission, which, by means of heat exchangers, is used to heat water and generate steam. The steam thus produced is used in conventional turbo-generators to make electric power.

The fuel employed in such nuclear power reactors is ordinarily contained in cylindrical nuclear reactor elements which are assembled in tiers to form rods. These rods are separated, when mounted in the reactor pile, by spaces through which a gaseous or liquid heat transfer medium is circulated in order to remove the heat produced. The heat transfer medium is then passed through heat exchangers whereby the heat produced is put to useful purposes, after which it is returned to the reactor pile. The individual nuclear reactor elements commonly contain three types of materials, i.e. nuclear fuel such as enriched uranium and/or uranium salts; fission products thereof, such as gases, alkali metals, alkaline earth metals, rare earth metals and the like; and matrix or encasing (canning) materials, such as metals and refractory materials, which are used to contain and sometimes to extend or dilute the nuclear fuel and the fission products. Power reactors of this type are described in Scientific American, vol. 198, pp. 29–35, 1958, and in Nucleonics, vol. 14, pp. 34–44, 1956.

The heat output of each nuclear reactor element drops rapidly after only a small percentage of the nuclear fuel therein has been converted into fission products. Therefore it is necessary to the efficient operation of the reactor as a whole that the remaining major portion of the nuclear fuel in so-called spent nuclear reactor elements be efficiently separated from the fission products and reused. Since this process must be repeated again and again during the use of the nuclear fuel (its complete consumption requiring many cycles), nuclear reactor elements must be designed so that the cost of cycling the extremely expensive nuclear fuel through use and recovery is as low as possible and is carried out as quickly as possible in order to reduce the overhead charge against the operation of the reactor. In addition, the nuclear reactor elements must be easily fabricated and must operate efficiently in the reactor, e.g. they must be corrosion and erosion resistant, they must have good mechanical strength and toughness at temperatures of several thousand degrees F. and the heat generated in the elements must be readily conducted to the surfaces thereof.

In view of these considerations, the selection of an appropriate matrix or encasing material becomes essential to the design of a successful nuclear reactor element. A promising material for this use, particularly in gas-cooled reactors, is graphite. Graphite is an excellent conductor of heat, and is highly resistant to corrosion. It can be heated to temperatures above 3600° F. when an inert gas, for example, helium, is employed as a heat transfer medium, without appreciable reaction, vaporization or formation of gaseous products and its mechanical strength and toughness often exceeds that of metals at temperatures encountered in nuclear power reactors. In addition, graphite is easily fabricated (e.g. in the shape of cans or encasing means for the nuclear fuel) and is easily and inexpensively obtained.

The successful use of graphite as the matrix or encasing material in nuclear reactor elements is dependent, however, on finding an efficient low cost process of cycling nuclear fuel used in such elements. Such a process has been foreseen in a nuclear fuel recovery process which utilizes oxidative slagging. In this process the spent reactor fuel element is subjected to oxidizing conditions at moderately high temperatures in order to remove the graphite by oxidizing it to carbon monoxide and/or carbon dioxide and to oxidize the uranium fuel present to $U_3O_8$. The more volatile fission products are carried away in the gas stream and the less volatile fission products remain along with the uranium oxide as ash. The ash is dissolved in nitric acid, the uranium oxide being converted to uranyl nitrate. The solution is permitted to stand and is then decanted from any residue which may be present. The clarified solution is treated with tributyl phosphate and kerosene to remove the uranyl nitrate by solvent extraction. Most of the fission products will be separated from the uranium by this extraction, and the solution of uranium salt in tributyl phosphate and kerosene is precipitated with ammonia gas, producing a gelatinous precipitate of ammonium diuranate. This precipitate is removed by filtration, heated to about 800° F. in air to form the uranium oxide $U_3O_8$, which is then reduced with hydrogen to form $UO_2$, mixed with graphite powder and heated in the absence of oxygen to give uranium carbide ($UC_2$) for reprocessing in manufacturing new nuclear reactor elements. The nitric acid solution containing the fission products is evaporated to dryness and sealed in stainless steel tubes for storage. These fission products are useful, for example, as intense sources of gamma radiation.

When the recovery process outlined above was conceived, it was suggested that the first step (in which the graphite is removed by oxidation and the uranium fuel is oxidized to $U_3O_8$) be carried out at approximately 1800° F. in oxygen or air. In subsequent experimental investigations it has been found that oxidizing the spent fuel reactor element in either air or oxygen is not practicable. Since the oxidation of graphite at high temperatures in either oxygen or air is highly exothermic, temperature control cannot be easily maintained. This is extremely important since uncontrolled high temperatures may lead to volatilization and loss of or dissipation of valuable and highly radioactive fission products and even of uranium itself. Even if temperatures of the order of 1800° F. could be maintained, oxidation would occur so rapidly in air or oxygen that the surface of the graphite element would be weakened and spalling and breaking away of small, light solid particles would occur. In fact, however, no such temperature can be maintained. The oxidation of graphite in air or oxygen in this temperature range is highly exothermic and the temperature increases almost immediately resulting in increased surface spalling and formation of particles. These particles, many of which are swept into the oxidizing gas stream, carry with them both unconverted nuclear fuel and fission products. Thus, it is apparent that if the graphite is to be oxidized in either air or oxygen all of this material must be recovered. Such recovery is so difficult and expensive that any process which depends upon it is unattractive from the practical point of view.

It is an object of this invention to provide a highly efficient process for recovering unconsumed uranium-containing fuel materials from spent reactor fuel elements of the ceramic carbonaceous type. It is a further object of this invention to provide a process of recovering radioactive and fissionable products from carbon which contains such substances. Other objects of the invention will be apparent from the disclosure which follows.

The process of the invention is useful in the separation of unburned nuclear fuel from fission products and matrix materials in spent nuclear reactor fuel elements, in the recovery of radioactive materials from activated carbon used to filter radioactive gases, in the recovery of radioactive materials from carbon configurations (e.g. pipes) used in handling such materials, etc. For convenience, the disclosure herein will be directly largely to the recovery of nuclear fuel from spent nuclear reactor fuel elements although it is understood that the process of the invention applies generally to the recovery of radioactive materials from carbon containing them.

In accordance with the above and other objects of the invention, it has been found that when spent reactor fuel elements of the ceramic carbonaceous type are oxidized in an otherwise inert treating atmosphere containing from about 3 to about 7 percent by volume of oxygen (but preferably not more than about 5 percent by volume of oxygen) at a temperature of from about 1550° F. to about 1650° F., a nonself-sustaining (and hence controlled) combustion of the graphite to carbon dioxide (which contains some carbon-12 radioactive isotope) and oxidation of the unconverted uranium fuel to $U_3O_8$ is achieved without any weakening or spalling of the oxidizing surface and without any consequent entrainment of solid particles in the gas stream. In some cases it may be preferred to crush the individual elements before treating them in order to obtain a larger surface to volume ratio and/or to break through a coating on the surfaces of the elements. The entire process can be carried out on a scale which is limited only by considerations of the critical mass and the intense radioactivity.

The present process results in a controlled decomposition of the fuel element at a useful rate, leaving the solid products of oxidation quantitatively at the location of the oxidation and easily available to be subsequently treated by the process of recovery hereinbefore described.

After passing through the combustion zone, the gas stream contains carbon dioxide, helium, possibly some traces of oxygen and carbon monoxide and volatile fission products released by the heating. The stream is passed through a nickel catalyst which is maintained at 450° F. to convert any carbon monoxide to carbon dioxide then through a refrigeration cold trap at −20° C. to remove the most volatile fission products, treated with pyrogallol to remove the oxygen, passed through a hot copper coil trap to remove iodine, tellurium and ruthenium fission products and is then scrubbed through purified lime water, in which the carbon dioxide forms a filterable precipitate of calcium carbonate. This precipitate is readily isolated as a carbon-12 radioactive isotope source material. The gas is then passed through a cold trap at about −100° C. to remove radioactive xenon and krypton leaving relatively pure helium.

As previously noted, it is preferred to operate the process of the present invention in an inert atmosphere containing from about 3 to about 5 percent by volume of oxygen. This range is preferred as affording more easily maintained control together with a reasonable rate of decomposition of the fuel element, e.g. of the order of about 0.5 lb. per hour per square foot of original fuel element surface area. While up to 7 percent by volume of oxygen may be used in the treating atmosphere of the invention, oxidation takes place somewhat more rapidly when between 5 and 7 percent by volume of oxygen are used and, particularly at higher gas velocities, a tendency toward surface spalling may be seen.

Operating temperatures between about 1550 and 1650° F. have been found to be most satisfactory in the present process from both the standpoints of control and reaction rate. Thus, higher temperatures are unnecessary since a desirable rate of reaction occurs at or below 1650° F. and undesirable since the reaction may become self-sustaining (i.e. exothermic and uncontrolled). Lower temperatures are unnecessary since the reaction is easily controlled in the specified range (by adding sufficient heat to maintain temperature) and undesirable since the reaction is needlessly slower at lower temperatures.

The gases of group O of the periodic table of the elements having atomic weight below 200 (e.g. helium, neon, argon, krypton and xenon) are suitable for use as the inert portion of the oxidizing atmosphere utilized in the process of the invention because of their chemical inertness as well as their negligible susceptibility to the effects of radioactivity. Radon is excluded because of its radioactivity and because it is practically unavailable for use in the present process. Although nitrogen is also a suitable inert gas in the present invention it is not often used because of the possibility of forming undesirable nitrides of certain fission products. Helium and argon are ordinarily preferred in the present invention because of their chemical inertness, ready availability and relatively low cost.

The velocity at which the gas stream moves across the surface of the spent fuel element being treated is not a factor in the control of the reaction. It is generally desirable, however, to limit the velocity to less than that at which the ash (which contains the nuclear fuel and non-volatile fission products from the spent fuel element) can be picked up by the gas stream. On the other hand, some gas movement should be maintained in order to present sufficient oxygen to the surface of the element to maintain a reasonable rate of reaction.

In some cases it may be preferred to operate the process of the invention at other than atmospheric pressure, e.g. at less than one atmosphere, so that any leaks which occur in the system will not allow possibly radioactive gases to escape, but will rather allow surrounding gases to enter the system. Under such circumstances it may become necessary to adjust the amount of oxygen with respect to the amount of inert gas in the gas stream, e.g. if the pressure of the system is reduced to considerably less than atmospheric, it may be necessary to use proportionately more oxygen to maintain oxidation at the desired level.

Having thus described the invention in broad terms, it is further described by means of the following specific examples which are included for the purposes of illustration only and are not to be construed as limiting the scope of the invention.

*Example 1*

An electric resistance tube furnace is provided which has a ceramic heating chamber fitted with inlet and exhaust tubes for gas, so arranged that the gas can be recycled or expelled to other apparatus, helium and oxygen sources, and means for introducing spent nuclear reactor elements into the heating chamber without opening the apparatus to the atmosphere. A thermocouple connected to a pyrometer is employed for determining the temperature of the furnace, which is controlled with a variable transformer. An Orsat gas analysis system for determining the amount of carbon monoxide, oxygen and carbon dioxide in the inlet and exit gases is attached to the system.

The tube furnace is preheated to an operating temperature of approximately 1600° F., while sweeping the air from the apparatus with a mixture of helium and oxygen which contains about 3.5 percent by volume of the latter. After the air in the system has been replaced by the helium-oxygen gas mixture (which is passed through the furnace at the rate of about 5 cubic feet per hour when a 1 inch diameter ceramic heating chamber is used) and the operating temperature of the furnace has been reached, a spent uranium oxide-graphite fuel element weighing about 2.5 grams is introduced into the heating chamber. The furnace is maintained at 1600° F. for about 6 hours, while passing the helium-oxygen mixture through the furnace at the rate stated. During this time, the graphite present in the fuel element is converted to carbon dioxide leaving behind an ash consisting of $U_3O_8$ and fission products. The combustion gases, which contain carbon dioxide, helium and volatile fission products and traces of oxygen and carbon monoxide are passed through a refrigeration cold trap at about $-20°$ C. to remove the fission products of greatest volatility. The gas is passed through a solution of pyrogallate to remove traces of oxygen and then through a hot copper coil trap to remove iodine, tellurium and ruthenium fission products. The residual gas is bubbled through saturated lime water solution in a continuous precipitator, thereby converting the carbon dioxide to insoluble calcium carbonate, which contains beta-active carbon 12. After removal of the carbonates, the gas is treated in a cold trap at about $-100°$ C. to remove radioactive xenon and krypton. The remaining gas is relatively pure helium which, if it is of a sufficiently low level of radioactivity, can be monitored out of the stack. Alternatively it can be mixed with oxygen and recycled to the combustion system.

The solid material remaining in the electric furnace chamber after complete combustion is dissolved in nitric acid, and is processed to recover the uranium, plutonium and other fission products by a solvent extraction system of the type described in Nucleonics, volume 14, No. 3, page 40, 1956. In that process, the residual ash is dissolved by heating with nitric acid to form uranyl nitrate. The solution is permitted to stand and decanted from any residue. The clear solution is then treated with tributyl phosphate and kerosene to remove uranyl nitrate by solvent extraction. The fission products are thereby separated from the uranium. The uranium salt dissolved in tributyl phosphate and kerosene is precipitated with ammonia gas, whereupon there is formed a gelatinous precipitate of ammonium diuranate. This is removed by centrifugal filtration and dried in air. The ammonium diuranate is heated to about 800° F. in air to form the uranium oxide $U_3O_8$. This can be purified and mixed with graphite powder, and heated without access of oxygen, to produce uranium carbide for reuse as a fuel source for nuclear fission reactors. The fission products and the aqueous nitric acid solution which are obtained by the recovery process are treated according to known methods, to recover useful materials.

*Example 2*

The process described in Example 1 is repeated, except that 5 percent of oxygen is used in the helium-oxygen mixture. The furnace is heated at about 1600° F. while carrying out the oxidation. It is found that spent fuel elements totaling about 2.565 grams are completely oxidized in a period of about 3 hours, with a carbon removal efficiency of about 96.5 percent.

It will be understood that the operations described herein are to be conducted with appropriate shielding, and by remote control, wherever necessary.

The terms and expressions which have been employed are used as terms of description and not of limitation, and it is not intended, in the use of such terms and expressions, to exclude any equivalents of the features shown and described or portions thereof, but it is recognized that various modifications are possible within the scope of the invention claimed.

What is claimed is:

1. An oxidative slagging process which comprises oxidizing graphite-encased uranium-containing nuclear fuel elements in an otherwise inert atmosphere containing from about 3 to about 7 volume percent of oxygen at a temperature in the range of about 1550–1650° F. and under conditions of non-self-sustaining combustion.

2. An oxidative slagging process which comprises oxidizing reactor fuel elements of the ceramic carbonaceous type in an otherwise inert atmosphere containing from about 3 to about 7 volume percent of oxygen at a temperature in the range of about 1550–1650° F. and under conditions of non-self-sustaining combustion.

3. The process according to claim 2 wherein the inert atmosphere contains from about 3 to about 5 volume percent of oxygen.

4. The process according to claim 2 wherein the inert portion of the treating atmosphere is a gas from group O of the periodic table of the elements of atomic weight less than 200.

5. The process according to claim 2 wherein the inert portion of the treating atmosphere is helium.

References Cited in the file of this patent

UNITED STATES PATENTS

| | | |
|---|---|---|
| 2,330,767 | Welty | Sept. 28, 1943 |
| 2,664,404 | Blatz et al. | Dec. 29, 1953 |
| 2,729,546 | Williamson | Jan. 3, 1956 |
| 2,797,081 | Sullivan | June 25, 1957 |

FOREIGN PATENTS

| | | |
|---|---|---|
| 599,495 | Great Britain | Mar. 15, 1948 |

OTHER REFERENCES

Daniels: Nucleonics, March 1956, vol. 14, pages 34—41.